(12) United States Patent
Cohen et al.

(10) Patent No.: US 7,910,004 B2
(45) Date of Patent: Mar. 22, 2011

(54) METHOD AND SYSTEM FOR MONITORING REVERSE OSMOSIS MEMBRANES

(75) Inventors: Yoram Cohen, Los Angeles, CA (US); Michal Uchymiak, Naples, FL (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/161,942

(22) PCT Filed: Jan. 24, 2007

(86) PCT No.: PCT/US2007/060999
§ 371 (c)(1),
(2), (4) Date: Jul. 23, 2008

(87) PCT Pub. No.: WO2007/087578
PCT Pub. Date: Aug. 2, 2007

(65) Prior Publication Data
US 2009/0045144 A1 Feb. 19, 2009

Related U.S. Application Data

(60) Provisional application No. 60/761,447, filed on Jan. 24, 2006.

(51) Int. Cl.
*B01D 61/00* (2006.01)
(52) U.S. Cl. ............ 210/652; 210/650; 210/321.6; 210/85; 210/94; 210/95; 210/96.2; 210/111; 422/101; 359/385
(58) Field of Classification Search ............ 210/85, 210/96.2, 650, 652, 94–95, 111, 321.6; 422/101; 359/385
See application file for complete search history.

(56) References Cited

U.S. PATENT DOCUMENTS

| 3,975,084 A | * | 8/1976 | Block .................. 356/335 |
| 4,151,086 A | * | 4/1979 | Frosch et al. ............ 210/108 |
| 4,374,891 A | * | 2/1983 | Ward, III ............... 428/220 |
| 5,017,009 A | * | 5/1991 | Schutt et al. ............ 356/338 |

(Continued)

FOREIGN PATENT DOCUMENTS

DE 3718407 A1 * 12/1988

(Continued)

OTHER PUBLICATIONS

Goodman, Douglas S, Illuminator for dark field microscopy, 1984, Optical Society of America, pp. 2670-2671.*

(Continued)

*Primary Examiner* — Tony G Soohoo
*Assistant Examiner* — David C Mellon
(74) *Attorney, Agent, or Firm* — Cooley LLP

(57) ABSTRACT

A monitoring system and a method for monitoring a reverse osmosis (RO) membrane in an RO unit is capable of detecting the formation of mineral salt crystals on the surface of the RO membrane. The monitoring system includes a reverse osmosis monitoring cell coupled to the RO unit so as to receive a sample stream taken from either the feed stream to, or the concentrate stream from, the RO unit. The cell has a visually observable RO membrane that is visible to an imaging system that creates and collects images of the visually-observable RO membrane, and that conveys an image data signal to a data processing system that is operable to translate the image data signal into visual images for display, and to correlate the data in the image data signal with a scaling condition on the RO membrane in the RO unit.

19 Claims, 5 Drawing Sheets

U.S. PATENT DOCUMENTS

| | | | | |
|---|---|---|---|---|
| 5,982,534 | A | * | 11/1999 | Pinkel et al. .................. 359/387 |
| 6,017,459 | A | * | 1/2000 | Zeiher et al. .................. 210/650 |
| 6,306,291 | B1 | | 10/2001 | Lueck |
| 6,463,790 | B1 | * | 10/2002 | Chun et al. ........................ 73/38 |
| 6,704,140 | B1 | * | 3/2004 | Richardson .................. 359/387 |
| 6,838,002 | B2 | * | 1/2005 | Zeiher et al. .................. 210/650 |
| 7,186,331 | B2 | * | 3/2007 | Maartens et al. ............... 210/90 |
| 2002/0134716 | A1 | | 9/2002 | Maartens et al. |

FOREIGN PATENT DOCUMENTS

| NL | 1028474 C2 | 9/2006 |
|---|---|---|
| WO | WO 2006/130815 A2 | 12/2006 |

OTHER PUBLICATIONS

Machine translation of DE 3718407 A1, pp. 1-2.*

Kang, Seok-Tae, et al., "Direct Observation of biofouling in cross-flow microfiltration: mechanisms of deposition and release," *Journal of Membrane Science*, Sep. 2004, pp. 151-165.

Floriano, Pierre N., et al., "Membrane-based on-line optical analysis system for rapid detection of bacteria and spores," *Biosensors and Bioelectroincs*, 2005, pp. 2079-2088.

Shill Wen-Yi, et al., Morphometric characterization of calcium sulfate dihydrate (gypsum) scale on reverse osmosis membranes, *Journal of Membrane Science*, 2005, pp. 253-263.

Uchymiak, Michal, et al., "A novel RO ex situ scale observation detector (EXSOD) for mineral scale characterization and early detection," *Journal of Membrane Science*, 2007, pp. 86-95.

Cohen et al., "Method and System for Monitoring Reverse Osmosis Membranes" International Search Report, International Publication No. WO 2007/087578 A3 published Aug. 2, 2007, 4 pages.

* cited by examiner

METHOD AND SYSTEM FOR MONITORING REVERSE OSMOSIS MEMBRANES

CROSS-REFERENCE TO RELATED APPLICATIONS

This application claims priority under 35 U.S.C. §119(e)(1) from U.S. Provisional Application No. 60/761,447, filed Jan. 24, 2006, entitled "Ex-Situ Scale Observation Detector (EXSOD) for Reverse Osmosis Membranes," the disclosure of which is incorporated by reference.

FEDERALLY SPONSORED RESEARCH OR DEVELOPMENT

Not Applicable

BACKGROUND OF THE INVENTION

This disclosure relates to a system and method for real time monitoring of scaling and fouling on reverse osmosis membranes.

Membrane technology is used for filtration of various liquids. This technology is particularly useful for water and wastewater treatment and water desalination as it is simple to operate, requires minimal chemical use, and produces consistent and reliable water quality.

Membrane technology may use different types of membranes for filtration. Membranes are classified according to the size of the particle that can pass through the membranes. Different types of membrane technology are categorized as microfiltration, ultrafiltration, nanofiltration and reverse osmosis. Microfiltration removes particles down to 0.1 micron, i.e. microorganisms such as *Cryptosporidium* and *Giardia*. Ultrafiltration (UF) removes particles from 0.01 to 0.1 micron. Nanofiltration (NF) removes most organic compounds, while Reverse Osmosis (RO) removes dissolved salts and metal ions.

In recent years, there has been a growing interest in the application of low pressure reverse osmosis and nanofiltraton membranes to the desalination of brackish water. In reverse osmosis and nanofiltration, a solution is passed through a semi-permeable membrane that rejects the solute and other impurities on one side (the "feed side") and allows the pure solvent to permeate through the membrane to be obtained from the other side (the "permeate") side.

Such membranes can provide high salt rejection and flux at low operating pressures. However, during desalination, significant levels of cations (e.g., calcium and barium) and anions (carbonate and sulfate) may concentrate near and at the membrane surface. The concentration of these ions near and at the membrane surface may exceed the solubility limits of various sparingly soluble mineral salts, such as calcium carbonate (calcite), calcium sulfate (gypsum) and barium sulfate (barite). These mineral salts may then precipitate in bulk near the membrane surface or crystallize directly onto the membrane surface.

The accumulation of these ions next to the membrane surface forms a concentration boundary layer that is referred to as the "concentration polarization" (CP) layer. The degree of concentration polarization (or CP) is often estimated using a simple film theory assumption:

$$CP = \frac{C_m - C_p}{C_b - C_p} = \exp\frac{J}{k} \quad (1)$$

where $C_m$ is the concentration near the membrane, $C_p$ is the permeate concentration, $C_b$ is the bulk concentration, J is the permeate flux and k is the solute mass transfer coefficient. When the CP level is high, the solution near the membrane surface may become supersaturated with respect to the concentration of various mineral salts. These supersaturated conditions may lead to surface crystallization near and at the membrane surface.

The crystallization on the membrane surface is referred to as "scaling." The deposition of organic matter on the membrane surface is called "fouling." Scaling and fouling may lead to permeate flux decline, may adversely affect salt passage, and may cause the eventual decrease in the useful life of the membrane.

To increase the life of a membrane, it is important to prevent or suppress scale formation. Suppression of scale formation may be achieved to some degree by pH adjustment for controlling calcite scaling and by the use of antiscalants for gypsum, barite and silica scale control. However, for the prevention and suppression of scaling, early detection of scaling is desirable, as it would provide for the optimization of scale mitigation strategies. Similarly, early detection of foulant deposition (e.g. biofilms) helps in prevention and mitigation of damage due to fouling.

In conventional real-time monitoring methods and devices, scaling or damage due to scaling (or fouling) is noticeable only via flux decline and salt passage monitoring. Available scale and fouling detection methods are not capable of real time early scale detection under reverse osmosis operating conditions. Therefore, reliable methods to predict membrane scaling and fouling are important tools in the control of scaling and fouling. It is also desirable to have a device that monitors membrane scaling in real-time while placed ex-situ. This enables the external application to a reverse osmosis plant without any major adjustments in the structure and function of the plant.

SUMMARY OF THE INVENTION

To achieve the aforementioned objectives, the invention disclosed herein and its equivalents (hereinafter "the inventions") provide a system and a method for monitoring scale deposition, particularly the deposition of mineral salt crystals, on the reverse osmosis membrane(s) in a reverse osmosis system, wherein the detection of scale deposits may be performed at the initial stages of their formation. In accordance with an aspect of the invention, the growth of salt crystals at specific locations on the surface of a reverse osmosis membrane in a reverse osmosis (RO) monitoring cell may be visually observed and recorded under magnification (preferably at different selectable magnification levels). The crystallization induction time, growth rate, and surface density of the initiation sites may be determined from direct membrane surface observation in the RO monitoring cell, and the visual data thereby obtained can be used to determine the initiation of scaling on the membrane(s) in the RO system, the instantaneous state of membrane scaling, and the growth rate of the scaling.

Broadly, the monitoring system comprises an RO monitoring cell having a visually-observable RO membrane, an imaging system, and a data processing or computer system. The RO monitoring cell receives a sample of solution from either the feed stream to or the concentrate stream generated from, the membrane channel of an RO module or unit in a reverse osmosis system. The monitoring cell defines a flow channel across the surface of the membrane that receives the sampled solution, wherein the flow channel and the membrane are observable through an optical window. An arrangement of mirrors is placed inside the flow channel for directing one or more light beams from a source (preferably a monochromatic source, such as an LED), across the membrane surface and into the imaging system. The imaging system, comprising a microscope and a camera (photographic or video), is optically linked to the cell so that it creates and collects images of the membrane of the monitoring RO cell, as illuminated by the light beam(s). The imaging system is linked to and updates the data processing system with a signal containing digitized collected images (visual data) that reveal the formation of scaling on the membrane surface at its initial stages, before trans-membrane flux is appreciably affected. The visual data may be viewed in real time or stored in computer memory for later viewing. This visual data, indicating the formation of scale on the membrane of the monitoring cell, correlates to, and is indicative of, the state of scale formation on the RO membranes) of the system.

In another aspect, a method for monitoring the formation of scaling on a reverse osmosis (RO) membrane in an RO unit or module of an RO system comprises the steps of passing a sample of solution from either the feed stream to, or the concentrate stream from, the membrane channel of the RO unit or module through an RO monitoring cell that includes a visually observable RO membrane; collecting visual data from the monitoring cell that indicates the presence and degree of scaling on the membrane; conveying the collected visual data to a data processing system; and using the data processing system to interpret the collected visual data to determine the extent of scaling or damage due to scaling on the RO membrane in the RO system. The monitoring system of the present invention can optionally be equipped with appropriate sensors or instruments to measure, in real-time, the flow rate, pH, conductivity and temperature of the feed and permeate flows. Information obtained from these types of monitoring can be useful in interpreting the impact of the surface scale as imaged by the membrane surface imaging system.

In still another aspect, a reverse osmosis cell for use in monitoring scaling in a reverse osmosis system is provided. The reverse osmosis monitoring cell comprises a reverse osmosis (RO) membrane having an active feed side with a visually observable surface; a flow channel configured and arranged to direct a sample of solution from either the feed stream to, or the concentrate stream from, the membrane channel of an RO unit or module in an RO system to the surface of the membrane; light-directing elements (such as a mirror arrangement) for directing a light beam from a light source across at least a portion of the surface of the membrane; and an optical window through which the surface of the membrane is visible.

This brief summary has been provided so that the nature of the invention may be understood quickly. A more complete understanding of the invention may be obtained by reference to the following detailed description of the preferred embodiments thereof in connection with the attached drawings.

BRIEF DESCRIPTION OF THE DRAWINGS

The present invention will now be described with reference to the drawings, in which the same components have the same reference numerals. The illustrated embodiment is intended to illustrate, but not to limit, the scope of the invention. The drawings include the following Figures.

DETAILED DESCRIPTION OF THE INVENTION

In one aspect of the invention, a reverse osmosis monitoring system for monitoring scale formation on reverse osmosis membranes in a reverse osmosis (RO) system is provided. The monitoring system as described herein comprises a reverse osmosis (RO) monitoring cell having a flow head configured to receive a sample of solution from the feed or concentrate side of the RO system and defining a flow channel across a monitoring reverse osmosis (RO) membrane, wherein the membrane is visible through an optical window in the flow head. An imaging system, comprising, for example, a microscope and a camera, is optically coupled to the monitoring cell so as to capture images of the RO membrane in the cell through the optical window, and to convert the captured images into a digitized visual data signal for transmission or conveyance to a data processing or computing system to which the imaging system is operatively linked. The computer or data processing system is configured to display the visual data and/or to store the data in a database, and it is programmed to interpret the visual data so as to allow an analysis of the scaling on the membrane(s) in the RO system.

The monitoring system, when connected to a feed side stream of a reverse osmosis system, enables the monitoring and recording, on-line, of changes in the membrane surface of an RO unit or module in the RO system. On-line monitoring enables the adoption of preemptive measures prior to irreversible membrane scaling which, if left unchecked, may result in a reduction in product recovery and damage to the membrane which, in-turn, may result in increased salt passage.

A monitoring system in accordance with the invention allows the investigation of the kinetics of scale formation on RO membranes for a range of operating conditions. Although the ensuing description refers to a reverse osmosis plant or facility, the monitoring system in accordance with the invention may also be used in connection with nanofiltration (NF), ultrafiltration (UF) and microfiltration (MF) processes.

To facilitate an understanding of a reverse osmosis monitoring system in accordance with the invention, a general overview of a reverse osmosis facility will be described. The specific structural components of the monitoring system will then be described with specific reference to the general structure of a reverse osmosis unit.

Figure 1:
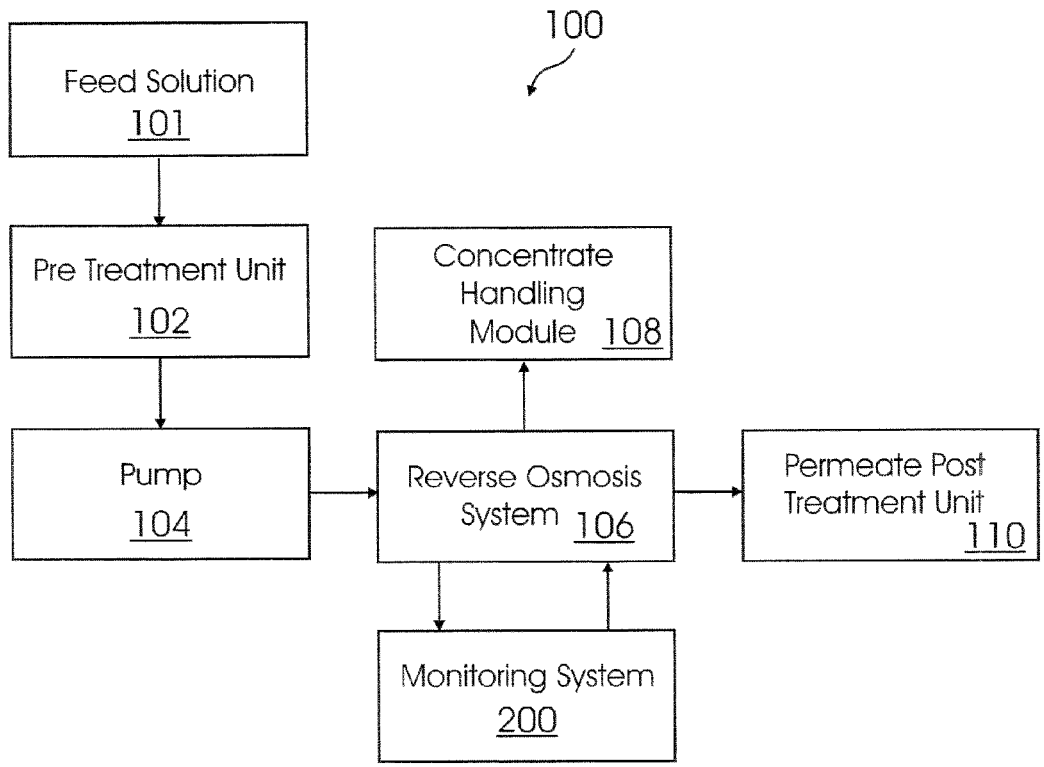
FIG. 1 is a functional block diagram of an exemplary reverse osmosis water desalination facility using a reverse osmosis monitoring system in accordance with the invention.

As shown in FIG. 1, in a reverse osmosis plant or facility 100, a feed solution or feed stream 101 (e.g., saltwater or brackish water) is first pretreated in a pretreatment system 102 to remove particulate matter that could interfere with the desalination process. The pretreatment system 102 may typically comprise one or more particulate filters or appropriate filtration membranes (not shown), as is well-known in the art. There may also be units for the addition to the feed solution of chemical additives for pH control, disinfection, and colloidal stabilization.

The pretreated feed solution is pumped, by a high pressure pump 104, to the feed side of an RO system 106, comprising one or more reverse osmosis (RO) units or modules, each of which has a membrane channel across the active feed side of an RO membrane (not shown). The feed solution stream is directed into the feed side of the membrane channel at high pressure, and the membrane separates solutes (e.g., dissolved mineral salts) from the water. The RO process performed by the membrane(s) in the RO system results in a concentrate solution stream being drawn or discharged from the concentrate side of the membrane channel of each RO module in the RO system 106, with a desalted liquid being drawn or discharged from the permeate side of each RO module. The concentrate solution containing the separated salts is removed from the RO system 106 to a concentrate handling module 108. Optionally, desalinated (fresh water) from the permeate side of the RO system 106 may further be treated in a permeate post-treatment module 110. The quality of the fresh water produced by the RO system 106 depends on the pressure applied to the RO membrane(s) therein, the concentration of salts in the feed solution, and the type of membrane(s) used.

A monitoring system 200, in accordance with an aspect of the invention disclosed herein and its equivalents, is coupled to the RO system 106 so as to take a sample stream from either the feed stream to, or the concentrate stream from, the membrane channel of one or more RO units or modules in the RO system 106. The sample stream is pumped to the monitoring system 200, as explained below, and the flow of the sample stream through the monitoring system 200 is monitored in real time. Images of any salt deposition or crystal formation and possibly various types of foulant deposition on a monitoring RO membrane in the monitoring system 200 are photographed and reported in real time. Through the combination of optical magnification and appropriate lighting, along with digital image capture and analysis processing, subtle changes in the crystallization boundaries are monitored. Based on the crystal formation, the monitoring system 200 can assist in regulating pre-emptive measures to prevent scale formation or growth of such crystals on the membrane(s) in the RO system 106.

In one embodiment, the monitoring system 200 may provide an alarm or alert about the formation of mineral salt scale on the RO membranes) in the RO system 106 before any significantly measurable flux decline is reported. Early detection of membrane scaling enables measures to be taken to save and/or extend a membrane's life. In another embodiment, the monitoring system may provide data relating to mineral scale formation and the kinetics of scale development.

Figure 2:
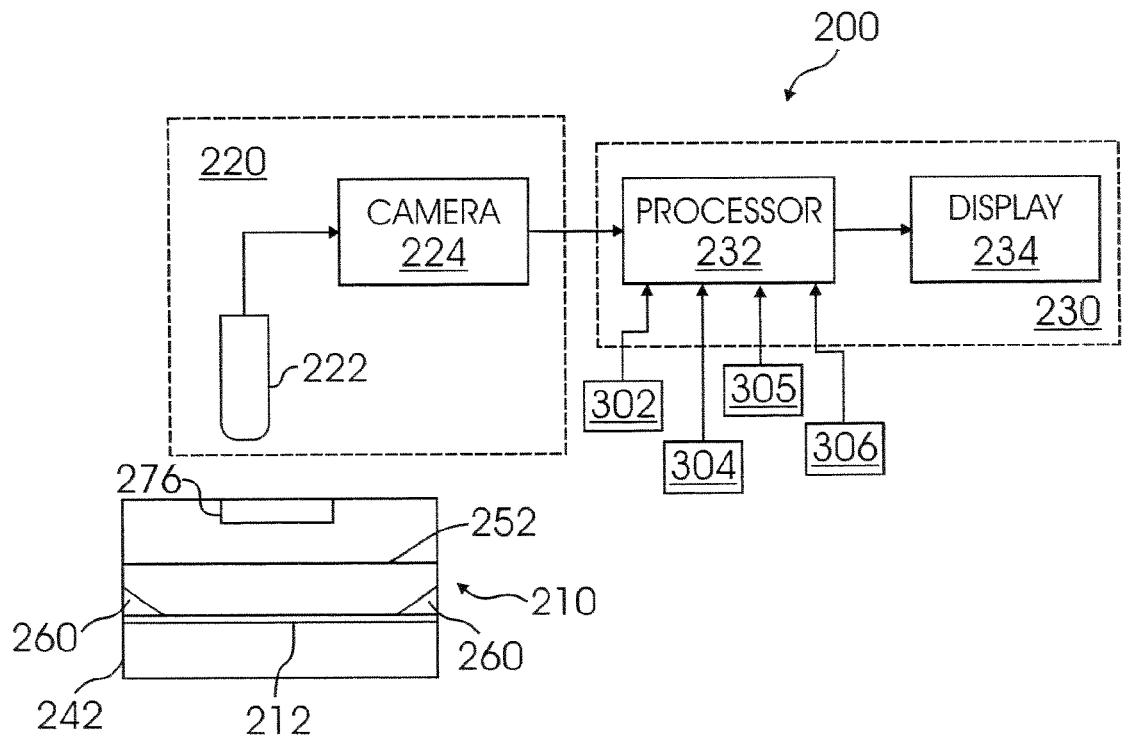
FIG. 2 is a diagrammatic view of a monitoring system in accordance with an exemplary embodiment of the invention.

FIG. 2 diagramatically illustrates a monitoring system 200 according to an exemplary embodiment of the invention. The monitoring system 200 includes an RO monitoring cell 210 with a visually-observable RO membrane 212, and an imaging system 220, comprising an optical imaging device 222 and an image capturing device 224. The imaging device 222 may be, for example, a microscope with variable magnification, and the image capturing device 224 may be, for example, a digital photographic (still) camera and/or a video CCD camera. The imaging system 220 transmits or conveys a digital signal containing visual data to a data acquisition or data processing system or computer system 230 that includes a processing unit 232, a video display or monitor 234, and, advantageously, a memory (not shown) in which a database is stored.

The RO membrane 212 has a first or active feed side, and a second or permeate side. The imaging device 222 is focused on the surface of the active feed-side of the RO membrane 212, as will be described below, and it is optically linked to the image capturing device 224, configured to digitize and record the optical signal from the imaging device 222. The images are transmitted or conveyed, in a digitized visual data signal, to the computer system 230 for real-time viewing on the display 234 and/or for storage in memory for further analysis. Thus, the imaging system 220 monitors and creates real time still images or video of the membrane 212 for transmission to the computing system 230. High resolution images may be viewed and analyzed in real time, or captured at preprogrammed time intervals and automatically stored in computer memory for further analysis.

The image capturing device 224 may be directly coupled to a local computer system 230, or it may be adapted for direct connection to a network (hard-wired or wireless), through which images can be uploaded. The images may also be downloaded via the network to a remote computer system. In either case, the computer system 230 includes software that enables detailed image analysis, using any of various measurements that can indicate the degree of membrane surface scaling, such as, for example, the percentage of scaled surface area, mineral salt crystal number density (number of crystals per unit of membrane surface area), the percentage of surface area covered by crystals, and the size distribution of surface crystals. Such software is either available or readily created, and is thus well within the normal skill in the pertinent arts to develop and employ in the context of the present invention.

Figure 3:
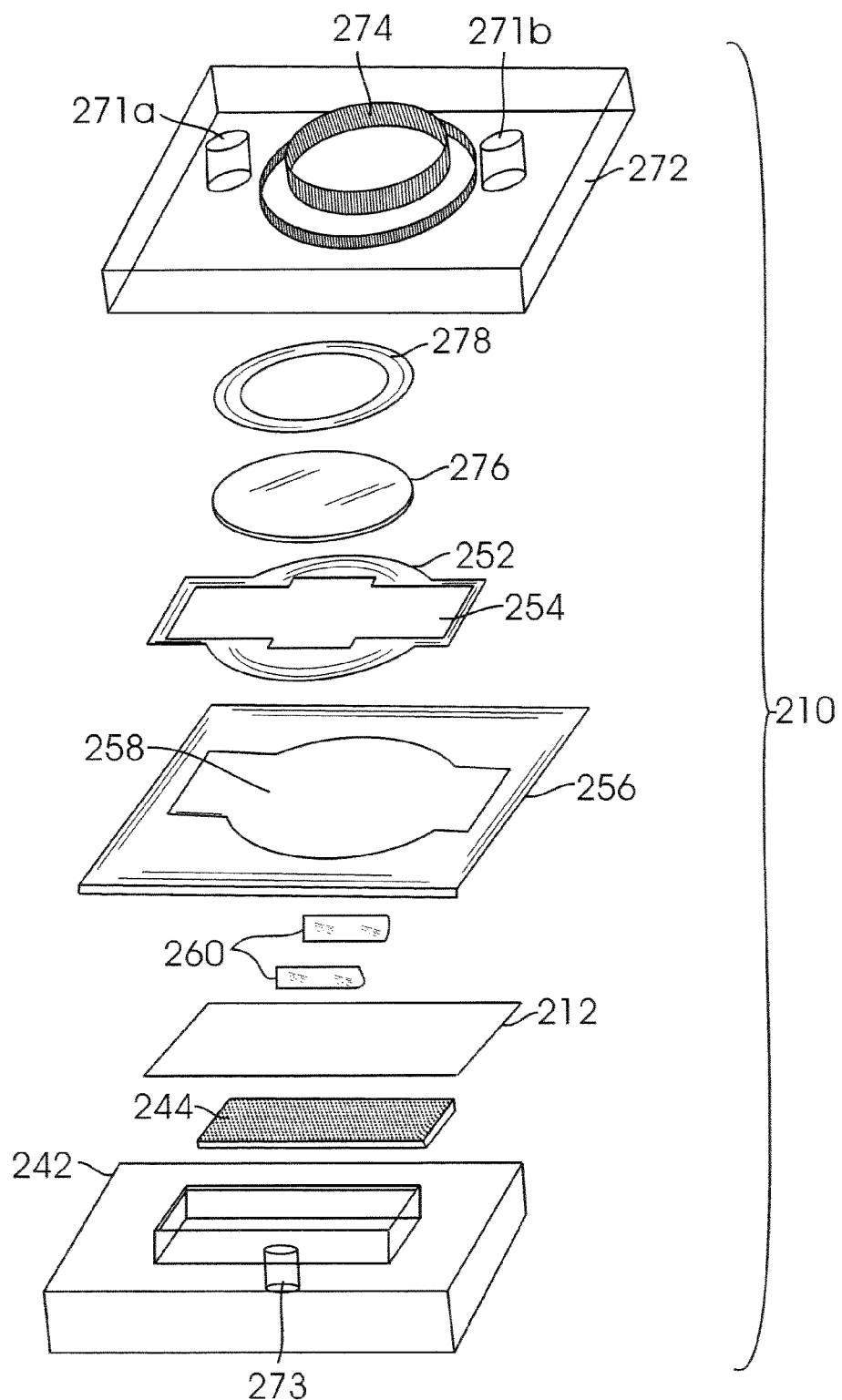
FIG. 3 is an exploded perspective view of an exemplary RO monitoring cell, as employed in an exemplary embodiment of the invention.

FIGS. 2 and 3 show the monitoring cell 210, in accordance with an exemplary embodiment of the invention, as having a base plate 242 having a porous portion, preferably in the form of a porous metallic insert 244, against which the permeate side of the membrane 212 seats, and that acts as a membrane support while allowing permeate flow through the membrane 212 from the active feed side to the permeate side thereof. The base plate 242 should be capable of withstanding the operational pressures in the monitoring RO cell 210, and it is advantageously non-corrosive. In a preferred embodiment, the base plate 242 may be made of an acetal copolymer such as that marketed by Ticona Engineering Polymers under the trademark CELCON® or any known equivalent, or, alternatively, stainless steel. The insert 244 may be made of porous steel or it may be a channel spacer. The base plate 242 also includes an outlet 273 for the permeate that passes through the insert 244.

A channel seal 252, having an interior opening 254, defines the depth and shape of a flow channel defined over the surface of the active feed side of the membrane 212. The periphery of the flow channel is defined by the configuration of the interior opening 254, while the depth of the flow channel is defined by the thickness of the channel seal 252. The channel seal 252 must be selected such that membrane distortion does not occur when a flow head 272 is fixed to the base plate 242 and tightened down against the membrane 212. Thus, the channel seal 252 is preferably made of a material that is firm but reasonably flexible, such as, for example, a relatively hard silicone rubber material.

For flow channels more than about 2 mm deep, extra support may be needed to ensure that the channel seal 252 is not distorted. The extra support may be provided by a rigid support plate 256, preferably made of a suitable polymer or plastic exhibiting the requisite strength, rigidity, and durability to withstand the pressures in the cell 210. The support plate 256 advantageously has a central opening 258 that receives and accommodates the channel seal 252.

An arrangement of one or more mirrors 260 is placed on or adjacent to the surface of the active feed side of the membrane 212. The mirror arrangement 260 directs light from a light source, as will be explained below, across at least a portion of the surface of the active feed side of the membrane 212 to allow low-angle, dark field illumination of the membrane surface. In one embodiment, as illustrated in the drawings, two mirrors 260 are placed on opposite sides of the flow channel. The mirrors 260 are preferably shorter in height than the depth of the flow channel so that they do not hinder proper sealing by the channel seal 252 and do not contact an optical window 276 (described below). To optimize the reflectance, front surface mirrors 260 may be used, in which the reflecting surface is disposed at an angle of less than 90°, with a 45° angle with respect to the membrane surface being the generally preferred mirror geometry. The mirrors 260 also have a flat bottom surface, in a preferred embodiment, so that they can rest on the membrane surface. The mirrors 260 are placed such that they reflect light from a light source, as discussed below, in the desired direction, preferably parallel or nearly parallel, to the membrane surface.

A flow head 272, having at least one viewing aperture 274, and at least one optical window 276 disposed on the underside of the flow cell head 272 in registration with the viewing aperture(s) 274, is fixed to the base 242 so as to define the aforementioned flow channel across the surface of the active feed side of the membrane 212. The flow head 272 is advantageously made of a material, such as stainless steel, that is both corrosion-resistant and capable of withstanding the operational pressures to which the monitoring cell 210 is subjected. The flow head 272 an inlet 271a to the flow channel for the sampled solution, and an outlet 271b from the flow channel, and it supports the optical window 276 without interfering with the hydrodynamic flow pattern in the membrane flow channel.

To relieve stress on the optical window 276, it is advantageously spaced from the flow head 272 by a window gasket 278. The flow head 272 is fixed to the base plate 242 by means such as bolts and nuts (not shown) or any suitable equivalent, thereby fixing the window 276 between the window gasket 278 and the channel seal 252, and fixing the channel seal 252 between the window 276 and the membrane 212 or (if present) the support plate 256.

As will be explained below, the optical window 276 passes incident light from one or more light sources 280 (FIGS. 4 and 5) to the mirrors 260, while providing an optical path from the surface of the active feed side of the membrane to the imaging device (microscope) 222. An optical window 276 that can transmit light over a wide spectral range is preferable, as is an optical window that is durable, has high strength and is sufficiently robust to withstand high pressure applications. In a preferred embodiment, the optical window 276 is made of optical quality transparent sapphire, which meets the aforementioned criteria.

As previously discussed, the imaging system 220 comprises the imaging device 222 (e.g., a microscope) and the image capturing device 224 (e.g., a digital photographic or video camera). The imaging device 222 receives an image of the surface of the visually-observable membrane through the optical window 276 of the cell 210, and the image capturing device 224 is optically coupled to the imaging device to capture the image and to create the visual data signal that is conveyed to the computer system 230. If the imaging device 222 is a microscope, as in the exemplary embodiment, the captured image is a magnified image of the membrane surface.

Figure 4:
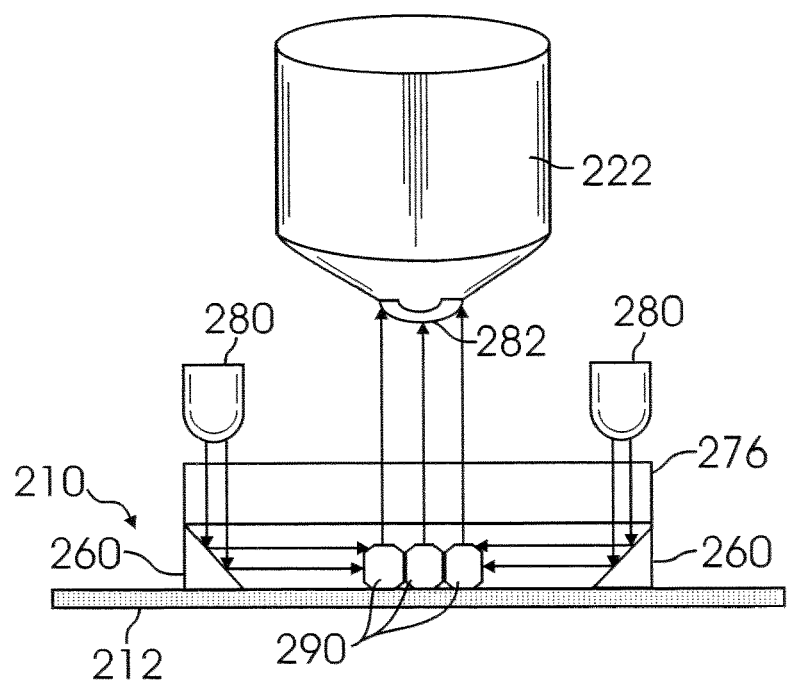
FIG. 4 is a semi-schematic view of an RO monitoring cell and imaging system in accordance with a first embodiment of the invention.
Figure 5:
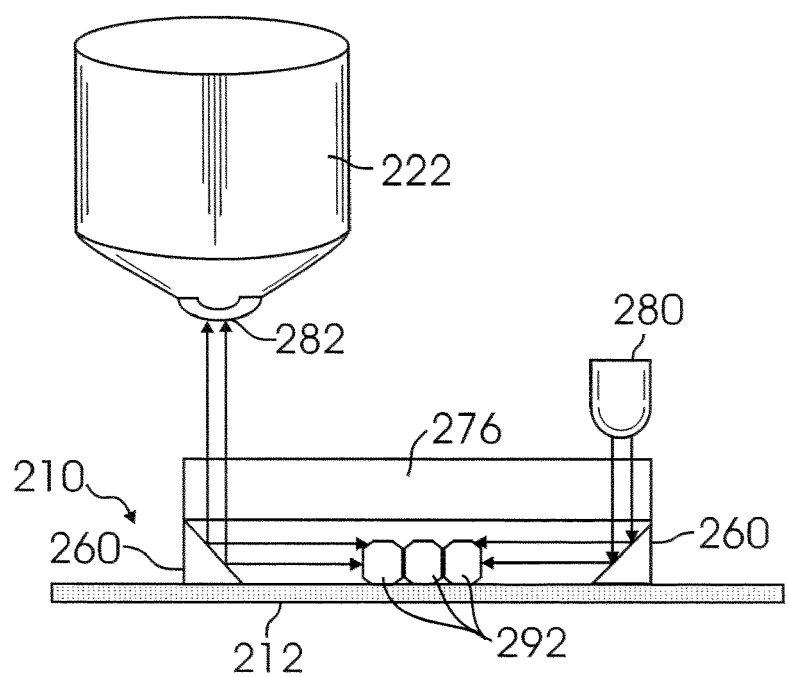
FIG. 5 is a semi-schematic view of an RO monitoring cell and imaging system in accordance with a second embodiment of the invention.

The imaging system 220 also includes one or more light sources 280, as shown in FIGS. 4 and 5, that illuminate the reverse osmosis cell 210, specifically, the surface of the active feed side of the membrane 212. The light sources 280, which may be either inside or outside the cell 210, preferably produce monochromatic light beams, which are more easily focused than are non-monochromatic beams. To this end, light emitting diodes (LEDs) are preferably used for the light sources 280. A light beam from each light source 280 is directed at the surface of the active feed side of the membrane 212, preferably perpendicularly, and it is reflected by one of the mirrors 260. The resulting reflected beam, propagating parallel to the membrane surface, is capable of generating clear images of mineral salt scalants (or foulants) as they develop (grow) on the membrane 212.

As shown in FIGS. 4 and 5, the microscope 222 has an objective lens 282 that is placed just above the optical window 276. Because the crystals of common mineral scaling compounds, such as gypsum, are typically transparent, a dark field microscopy technique is preferably used for viewing crystals formed on the membrane surface. The arrangement for dark field microscopy is shown in FIG. 4, which uses two separate light sources 280, each of which directs a separate light beam to one of the mirrors 260. The mirrors 260, in turn, reflect the light beams in opposite directions parallel to the surface of the membrane 212, where they will encounter any imperfections on the membrane surface, such as crystals 290. The crystals 290, in turn, will diffract and reflect light toward the microscope objective lens 282 to create an image that is magnified by the microscope 222 and captured by the camera 224.

The dark field microscopy technique can be effectively used to study crystal growth kinetics, as it provides good resolution of the subtle changes in the resulting images of crystal growth. Thus, crystal height can be readily observed and measured, and the crystals 290 can be observed in the initial stages of formation. In this way, a highly realistic estimate of the degree of scaling can be obtained, even in the early stages of scaling before flux is measurably affected.

FIG. 5 shows an alternative optical arrangement, using a single light source 280 that directs a light beam toward one of the mirrors 260. This light beam propagates parallel to the surface of the active feed side of the membrane 212 to illuminate a cross-section of the flow channel just above the membrane surface, passing through any objects 292 that are transparent on the membrane surface before being reflected by the opposite mirror 260 into the microscope objective lens 282, so that the objects 292 can be observed. This arrangement provides side views of surface crystals, and, along with the arrangement shown in FIG. 4, is useful in enabling digital reconstruction of three-dimensional images of surface crystals. This arrangement is also useful for determining flow velocities based on the observation of particles or dye streaks in the flow channel.

Although the present invention specifies the use of at least two mirrors for directing one or more light beams from one or more sources across the membrane surface and into the imaging system, it is within the scope of the present invention to use a single mirror for directing incoming light parallel or nearly parallel to the membrane surface. Thus, for example, a single mirror can be located and oriented so that there will be some of the light scattered by the scaling crystals on the membrane is directed parallel to all or part of the membrane surface.

The computer system 230 that receives the digitized visual data signals from the camera 224 is operable to correlate the data in the visual data signal with the condition of the RO membrane(s) in the RO system 106. The computer system 230 may also be operated as a data acquisition system for real-time recording and control of operational parameters such as trans-membrane pressure and permeate flow rate. Thus, the monitoring system 200 may be equipped with the appropriate valves and pressure regulators (not shown) for the adjustment of the desired trans-membrane pressure and cross-flow velocity through the monitoring cell 210. Such control devices are advantageously operated under the control of the computer system 230.

For example, as shown in FIG. 2, a digital liquid flow meter 302 may interface with the computer system 230 for the monitoring of permeate flow. Feed solution and/or permeate conductivity and pH may be measured on-line with a conductivity probe 304 and a pH meter 305, respectively. A pressure transducer 306 may monitor the pressure during the desalination process. The pressure transducer 306, flow meter 302, conductivity probe 304, and pH meter 305 are interfaced with data acquisition hardware and software, where readings are recorded at the desired time intervals (e.g., typically from once a minute to once an hour or once per day). An analog-to-digital converter (not shown) may be needed if the pressure transducer, flow meter, pH meter, and conductivity probes provide analog signals.

Images of the scaled membrane surface in the monitoring cell 210 may be processed with commercially available image analysis software, such as, for example, the software marketed under the trade name "Fovea Pro, Version 3.0," by Reindeer Graphics, of Asheville, N.C. The image analysis may include analysis of one or more crystal parameters, such as crystal area, equivalent diameter, roundness, symmetry, and length to width ratio. In addition, the surface number density of crystals and/or the membrane surface area covered by scale may also be determined as a function of time. The recorded images may also be analyzed for early signs of crystal formation to provide early detection of the onset of surface scaling as an early warning system.

Figure 6:
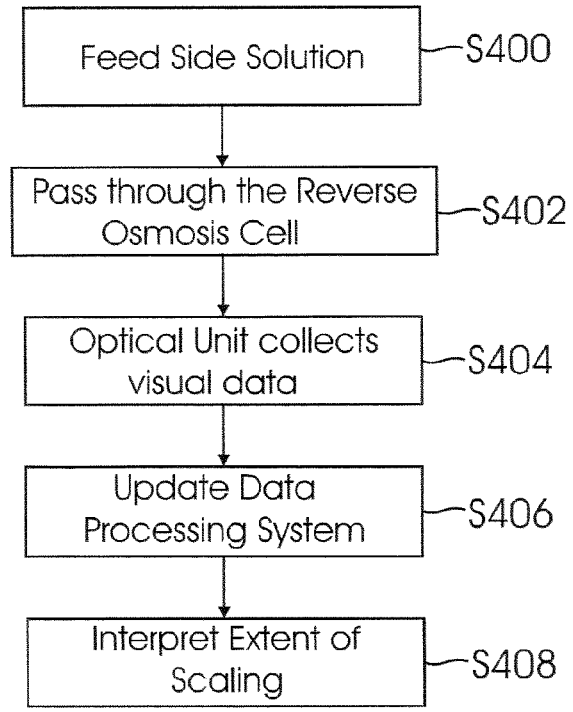
FIG. 6 is a block diagram illustrating the steps of a reverse osmosis membrane monitoring method, in accordance with an aspect of the invention.

FIG. 6 outlines the process steps for use of a monitoring system in accordance with the present invention. Solution from the either the feed stream to, or the concentrate stream from, the feed side of an RO system is tapped or sampled (step S400) and passed, at a predetermined pressure and flow rate, through a monitoring cell 210 of the monitoring system 200 (step S402). In step S404, the imaging system 220 views the surface of the active feed side of the membrane 212 in the monitoring cell 210 and collects and records visual or image data. In step S406, the digitized image data are sent to the computer or data processing system 230, where they may be displayed on a display device such as a monitor, and/or used to update a database in the computer system memory. In step S408, the image data are interpreted in the computer system 230, with the aid of software, such as that described above, to determine the extent and (optionally) the kinetics of membrane scaling. Step S408 also helps in determining the mitigation strategies, if any that may be used to prevent or minimize scaling in the RO system with which the monitoring system 200 of the present invention is used.

Figure 7:
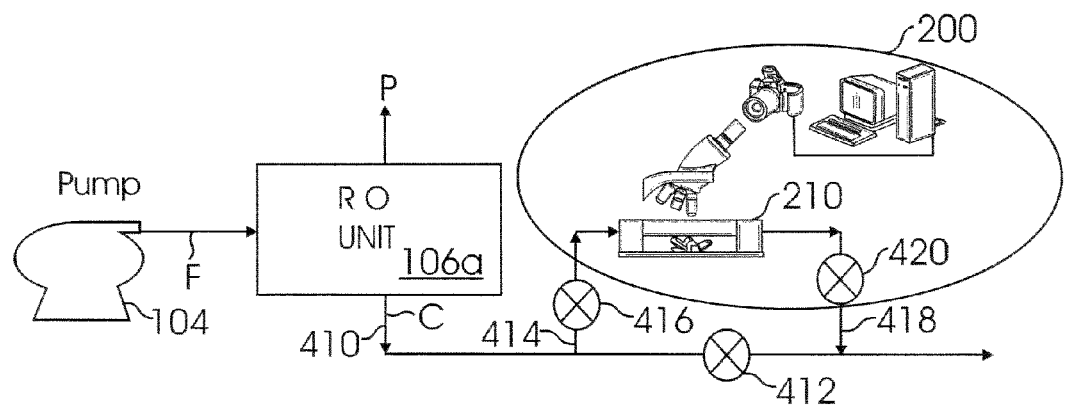
FIG. 7 is a schematic view of the monitoring system of the present invention in a "series" arrangement with a reverse osmosis system.

FIG. 7 is a schematic diagram of one type of system for monitoring an RO membrane in a reverse osmosis unit or module 106a of an RO system 106. The arrangement of FIG. 7 is a "series" arrangement that receives a sample stream from the concentrate stream from an RO unit 106a in the RO system 106 shown in FIG. 1. In this arrangement, feed solution F is pumped into the feed side of the RO unit 106a by means of a pump 104, as noted previously in connection with FIG. 1. Permeate P exits from the permeate side of the unit 106a. The concentrate stream C, flowing from the concentrate side of the membrane channel of the RO unit 106a through a concentrate conduit 410 having a main flow control valve 412, is tapped or sampled upstream from the main valve 412 by a bypass conduit 414 having a bypass valve 416. The bypass conduit 414 conducts the sampled concentrate to the monitoring cell 210 of the monitoring system 200. Return flow from the monitoring cell 210 to the concentrate conduit 410 downstream from the main valve 412 is through an outlet conduit 418 controlled by an outlet valve 420.

The valves 412, 416, 420 may be used to control the flow rate that is directed to the monitoring cell 210. The concentration polarization in the monitoring cell 210 may also be adjusted relative to the concentration polarization level in the RO system 106 by means of the bypass valve 416 and the outlet valve 420. This arrangement enables the adjustment of the concentration polarization level at the membrane surface in the monitoring cell 210 to match or exceed the level expected on the RO membrane(s) in the RO system 106. Furthermore, by exposing the membrane 212 of the RO monitoring cell to the mineral-rich concentrate solution, the monitoring system shown in FIG. 7 provides the earliest possible indication of scalant deposition or growth on the membrane(s) of the RO unit 106a.

Figure 8:
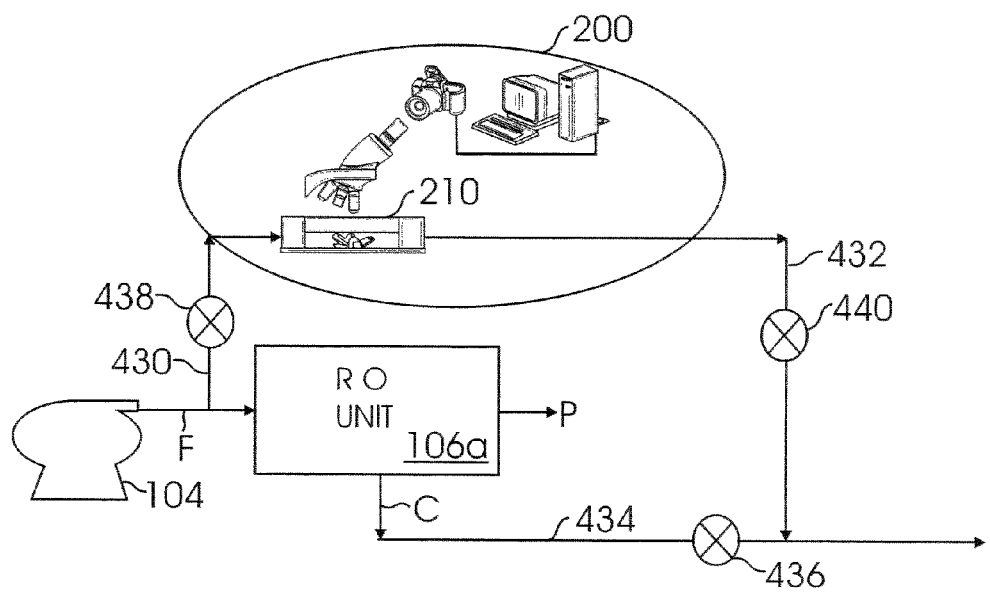
FIG. 8 is a schematic view of the monitoring system of the invention in a "parallel" arrangement with a reverse osmosis system.

In an alternate monitoring system, shown schematically in FIG. 8, the monitoring RO cell 210 is set in parallel with the reverse osmosis unit 10a by installing the monitoring cell 210 so that it takes a sample stream from the feed stream F entering the feed side of the RO unit 106a. The sample stream is conducted through a bypass conduit 430 having a bypass valve 438. The concentrate stream C is directed from the concentrate side of the membrane channel of the RO unit 106a through a concentrate conduit 434, controlled by a main control valve 436. Return flow from the RO monitoring cell 210 to the concentrate conduit 434 downstream from the main flow control valve 436 is through an outlet conduit 432 controlled by an outlet valve 440. The valves 436, 438, 440 may be used to control the flow rate that is directed to the monitoring cell 210. The concentration polarization level in the RO cell 210 may also be adjusted relative to the concentration polarization level in the RO unit 106a by means of the bypass valve 438 and the outlet valve 440. In this arrangement, the scaling propensity of the feed stream to the RO unit 106a is monitored by the monitoring system 200 with the ability to adjust the level of concentration polarization in the monitoring cell 210.

The monitoring system 200 may also be used in assessing the operating conditions for preventing or minimizing the deposition of scale, and for the removal of scale. For example, upon flow reversal, mineral salt crystals that have grown preferentially near the exit region of an RO unit will re-dissolve for a period of time, since the exit region is now the entrance region, while crystals will begin to grow at the exit region (the entrance region in the previous operational cycle).

Figure 9:
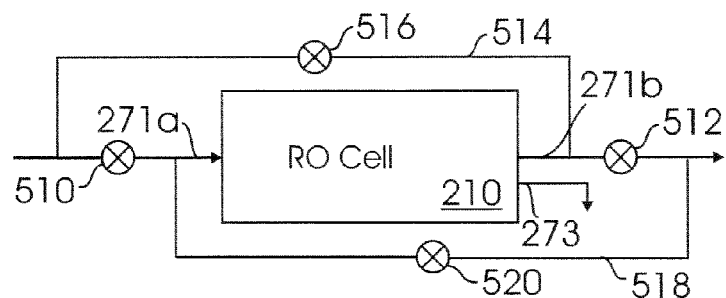
FIG. 9 is a schematic diagram showing the flow of feed solution for evaluating an operational mode of the invention for mitigating scaling formation in accordance with an aspect of the invention.

FIG. 9 schematically shows an exemplary setup for evaluating flow reversal for mitigating scale formation. In this system, once the computing system 230 detects and reports the onset of crystallization on the membrane surface, the feed flow is reversed such that the water feed source is now fed to the RO cell 210 of the monitoring system 200 from what was previously the exit region. In such an approach, the regions of high concentration near the membrane surface (resulting from concentration polarization) are then transformed into lower concentrations, and conversely the low concentrations are transformed into high concentrations.

As shown in FIG. 9, during normal operating conditions the RO cell inlet 271a is opened by an inlet valve 510, and the RO cell outlet 271b is opened by an outlet valve 512. A first bypass conduit 514, extending from the upstream side of the inlet valve 510 to the upstream side of the outlet valve 512, is closed by a first bypass valve 516. Likewise, a second bypass conduit 518, extending from the downstream side of the inlet valve 510 to the downstream side of the outlet valve 512, is closed by a second bypass valve 520. To reverse flow, the bypass valves 516, 520 are opened, and once that is accomplished, the inlet valve 510 and the outlet valve 512 are slowly closed. The switch in flow direction exposes crystals on the RO membrane 212 in the RO cell 210 to a lower saturation solution, partially dissolving surface crystals in the entrance region that was previously the exit region. The reversal of flow direction, as achieved by the configuration shown in FIG. 9, can be performed periodically through appropriate automation (not shown), thereby enabling RO operation that minimizes mineral scale development.

It can be seen that a monitoring system 200 in accordance with the invention enables direct visual real-time monitoring of mineral surface scaling on reverse osmosis membranes. The system enables the detection of scaling at very early stages of formation, in advance of any measurable flux decline. Monitoring of crystal growth on the reverse osmosis membranes also enables the study of patterns of growth of the crystals on the membrane surface. Based on the study of crystal growth on the membrane surface, strategies for mitigating crystal growth may be planned.

A monitoring system in accordance with the invention may be interfaced with an RO or NF facility such that a small side stream of feed solution is diverted to the monitoring system. The operating conditions in the monitoring system may be adjusted such that the level of concentration polarization (and thus mineral salt saturation level at the membrane surface), as experienced in the RO module, is equivalent to or set higher relative to the conditions that exist in the plant RO module being monitored. The above can be achieved by controlling the trans-membrane pressure and cross flow velocity in the RO monitoring cell. For example, lower pressure in the RO monitoring cell 210 will result in lower permeation flow and thus lower concentration polarization, while a lower cross flow velocity will result in a higher concentration polarization level.

While a monitoring system presenting accordance with the invention is particularly well-suited for monitoring mineral salt scaling on an RO membrane, many types of organic foulants may also be monitored, provided that they can be visualized by the imaging system 220 that is used in the invention. Thus, mineral salt crystallization and the accumulation of other types of foulants on the membrane 212 may be observed through the optical window 276 of the monitoring cell 210. By such direct observation, the invention may detect mineral salt scale formation and certain types of foulant accumulation prior to the detection of flux decline that would normally be attributed to scaling and/or fouling.

The monitoring system 200 may also be used as a tool for optimizing membrane cleaning protocols. In this application, the impact of cleaning procedures on the membrane surface may be observed in real time, showing any residual scale on the membrane surface, as well as the dynamics of the cleaning process. In this manner, one may be able to determine precisely when the membrane is completely cleaned.

In one aspect of the invention, multiple monitoring systems may be used in a water treatment plant, as membrane scaling may occur at different rates in different parts of the plant. Similarly, multiple monitoring systems may be installed to monitor different sections of an RO or NF plant.

The monitoring system may also be used as a research tool to study membrane and antiscalant performance. Colloidal fouling, the performance of biofouling antiscalants and the effectiveness of cleaning agents may be studied using the monitoring system of the present invention. The monitoring system may also be used as a research tool to determine the kinetics, size, and number density of scale crystals growing in real time.

A significant application of the monitoring system is the early detection of scale growth prior to the observation of any significant flux decline. Furthermore, the monitoring system 200 is capable of detecting the first signs of crystallization, even in areas of lower concentration polarization.

Real-time direct observations of the membrane surface may be particularly useful in assessing the impact of operating conditions on both scale development and surface crystal dissolution. For example, visual observation of the membrane surface can provide a useful indication of the effectiveness of membrane cleaning strategies by enabling the comparison of the surface before, during, and after the cleaning process.

A monitoring system in accordance with the invention is also suitable for developing fundamental data on the kinetics of surface crystallization, the extent of surface scale coverage, and the evolution of the number density of surface crystals. Such data should be useful in guiding the development of predictive models of scale formation. In addition, experience with experimental embodiments of the invention suggests that the visual monitoring of scale formation and removal under actual RO operating conditions is useful as a laboratory diagnostic tool for establishing and verifying the range of operating conditions that will minimize scale formation, and for assessing water source scaling propensity and the effectiveness of feed pretreatment strategies in reducing or minimizing scaling and fouling.

It will be appreciated from the foregoing description that the disclosed invention and its equivalents can be implemented in a variety of forms. Therefore, while the invention has been described in connection with particular examples, the true scope of the invention should be limited not by the specific embodiments described herein, but rather by the claims that follow and any equivalents thereof that may suggest themselves to those skilled in the pertinent arts.

What is claimed is:

1. A monitoring system for monitoring membrane scaling in a reverse osmosis (RO) unit having an RO membrane, wherein the RO unit receives a feed stream and discharges a concentrate stream, the monitoring system comprising:

a monitoring cell having a visually-observable RO membrane, the monitoring cell being configured and arranged relative to the RO unit so as to receive a sample stream from either the feed stream or the concentrate stream of the RO unit and to pass the sample stream across a surface of the visually-observable RO membrane, whereby solutes in the sample stream are deposited on the membrane surface;

an imaging system configured and located relative to the monitoring cell so as to be operable to (a) capture an image of the surface of the visually-observable RO membrane, and (b) create an image data signal indicative of the captured image;

a light source configured and located relative to the monitoring cell so as to direct light along a first direction;

a reflecting arrangement in the monitoring cell and configured and located relative to the surface of the visually-observable RO membrane so as to direct the light from the light source across at least a portion of the surface of the visually-observable RO membrane and along a different, second direction substantially parallel to the surface of the visually-observable RO membrane to provide dark field illumination thereof, and then to direct the light into the imaging system, wherein the light from the reflecting arrangement is directed along the second direction and is sufficiently closely spaced to the surface of the visually-observable RO membrane so as to pass through or be reflected by scaling on the visually-observable RO membrane; and a data processing system operatively linked to the imaging system so as to receive the image data signal therefrom, the data processing system being operable to analyze the image data signal so as to provide an indication of the extent of scaling on the visually-observable RO membrane.

2. The monitoring system of claim 1, wherein the data processing system is operable to process the image data signal so as to correlate the extent of scaling on the visually-observable RO membrane with a scaling condition of the RO membrane in the RO unit.

3. The monitoring system of either of claim 1 or 2, wherein the monitoring cell is configured and arranged relative to the RO unit so as to receive the sample stream from the concentrate stream.

4. The monitoring system of either of claim 1 or 2, wherein the monitoring cell comprises:

a flow head defining a flow channel across the surface of the visually-observable membrane and having an inlet to the flow channel configured to receive the sample stream, and an outlet from the flow channel for the sample stream; and an optical window in the flow head through which the surface of the visually-observable RO membrane is visible;

wherein the reflecting arrangement is located within the flow channel and is configured to direct light into the imaging system through the optical window.

5. The monitoring system of claim 4, wherein the imaging system comprises:

a microscope located relative to the flow head so as to receive an image of the surface of the visually-observable membrane through the optical window and to create a magnified image therefrom; and a camera optically coupled to the microscope so as to receive the magnified image and operable to create the image data signal.

6. The monitoring system of claim 5, wherein the camera is selected from the group consisting of at least one of a digital still camera and a video camera.

7. A method for monitoring membrane scaling, the method comprising:

providing a reverse osmosis membrane in a reverse osmosis unit that receives a feed stream and discharges a concentrate stream;

providing a reverse osmosis monitoring cell having a visually-observable RO membrane with a surface on an active feed side, wherein the visually-observable RO membrane is distinct from the reverse osmosis membrane in the reverse osmosis unit;

passing a sample stream from either the feed stream or the concentrate stream of the reverse osmosis unit across the surface of the visually-observable RO membrane;

using a mirror arrangement configured for specular reflection, directing light across at least a portion of the surface of the visually-observable RO membrane and along a direction substantially parallel to the surface of the visually-observable RO membrane to provide dark field illumination thereof;

collecting visual data from the illuminated portion of the surface of the visually-observable membrane, wherein the collected data indicate the presence and degree of scaling on the surface of the visually-observable RO membrane;

conveying the collected visual data to a data processing system; and interpreting the collected visual data with the data processing system to determine the extent of scaling on the reverse osmosis membrane in the reverse osmosis unit.

8. The method claim 7, further comprising the step of controlling the reverse osmosis unit in response to the extent of scaling on the visually-observable RO membrane.

9. The method of either of claim 7 or 8, wherein the step of interpreting the collected visual data includes at least one of displaying a real time image of the surface of the visually-observable membrane, and correlating the collected visual data to a scaling condition of the reverse osmosis membrane in the reverse osmosis unit.

10. A reverse osmosis (RO) monitoring cell for use in monitoring membrane scaling on a RO membrane in a RO unit that receives a feed stream and discharges a concentrate stream, the monitoring cell comprising:

a visually-observable RO membrane having a first surface on an active feed-side;

a flow head configured and arranged to direct a sample stream from either the feed stream or the concentrate stream of the RO unit across the first surface of the visually-observable membrane;

an optical window in the flow head through which the first surface of the visually-observable membrane is visible; and a mirror arrangement in the monitoring cell, and configured and located relative to the first surface of the visually-observable membrane so as to specularly reflect light from a light source across at least a portion of the first surface of the visually-observable membrane to provide dark field illumination thereof, wherein the mirror arrangement comprises a first portion and a second portion, the light from the light source passes through the optical window, the first portion reflects the light from the light source so as to pass through scaling on the first surface of the visually-observable membrane, and the second portion reflects the light that passes through the scaling through the optical window, thereby making the scaling on the first surface visible through the optical window.

11. The monitoring cell of claim 10, wherein the visually-observable membrane has an opposed permeate side with a second surface, the monitoring cell further comprising:
 a base having a porous portion engaging the second surface of the visually-observable membrane; and
 a permeate outlet located in the base so as to permit the outflow of permeate from the permeate side of the visually-observable membrane through the porous portion,
 wherein the mirror arrangement is configured to direct light from the light source along a direction substantially parallel to the first surface of the visually-observable membrane.

12. The monitoring cell of claim 10, wherein the flow head defines a flow channel across the first surface, and wherein the mirror arrangement comprises mirrors located on opposite sides of the flow channel adjacent the first surface.

13. The method of either of claim 7 or 8, wherein the step of collecting visual data from the surface of the visually-observable membrane includes the steps of (a) creating an optical image of the surface, and (b) converting the optical image to an image data signal having the visual data therein.

14. The method of either of claim 7 or 8, wherein the step of passing a sample stream across the surface of the visually observable membrane includes passing the sample stream through the monitoring cell in a first flow direction, the method further comprising:
 after the step of interpreting the collected visual data, reversing the flow direction of the sample stream through the monitoring cell if a predetermined extent of scaling is detected.

15. The monitoring system of claim 4, wherein the light source comprises a first light source and a second light source, and the reflecting arrangement comprises:
 first and second mirrors disposed on opposite sides of the flow channel, the first mirror reflecting light from the first light source across the surface of the visually observable RO membrane toward the second mirror, the second mirror reflecting light from the second light source across the surface of the visually observable RO membrane toward the first mirror, whereby light reflected from each of the mirrors is then reflected by scaling on the surface of the visually-observable RO membrane into the imaging system.

16. The monitoring system of claim 4, wherein the reflecting arrangement comprises:
 first and second mirrors disposed on opposite sides of the flow channel, the first mirror reflecting light from the light source across the surface of the visually observable RO membrane toward the second mirror, the second mirror then reflecting the light into the imaging system.

17. The monitoring system of claim 1, wherein the light directed by the light source along the first direction is substantially perpendicular to the surface of the visually-observable RO membrane.

18. The monitoring system of claim 1, wherein the monitoring cell is configured to operate at pressures associated with the RO unit.

19. The monitoring cell of claim 10, wherein the light source is configured to direct light along a direction substantially perpendicular to the first surface of the visually-observable membrane, and the mirror arrangement is configured to direct the light from the light source along a direction substantially parallel to the first surface of the visually-observable membrane.

* * * * *